US010367383B2

(12) United States Patent
Yamagata

(10) Patent No.: US 10,367,383 B2
(45) Date of Patent: Jul. 30, 2019

(54) STRUCTURE FOR FIXING PERMANENT MAGNET AND MOTOR AND METHOD OF FIXING PERMANENT MAGNET

(71) Applicant: Mabuchi Motor Co., Ltd., Matsudo, Chiba (JP)

(72) Inventor: Yasuhiro Yamagata, Matsudo (JP)

(73) Assignee: MABUCHI MOTOR CO., LTD., Matsudo, Chiba (JP)

(*) Notice: Subject to any disclaimer, the term of this patent is extended or adjusted under 35 U.S.C. 154(b) by 86 days.

(21) Appl. No.: 15/431,640

(22) PCT Filed: Nov. 24, 2015

(86) PCT No.: PCT/JP2015/082894
§ 371 (c)(1),
(2) Date: Feb. 13, 2017

(87) PCT Pub. No.: WO2016/093051
PCT Pub. Date: Jun. 16, 2016

(65) Prior Publication Data
US 2017/0264150 A1   Sep. 14, 2017

(30) Foreign Application Priority Data
Dec. 8, 2014   (JP) .................... 2014-248287

(51) Int. Cl.
*H01F 7/02* (2006.01)
*H02K 1/17* (2006.01)
(Continued)

(52) U.S. Cl.
CPC .............. *H02K 1/17* (2013.01); *H01F 7/021* (2013.01); *H01F 7/0221* (2013.01); *H02K 1/02* (2013.01); *H02K 23/40* (2013.01); *H02K 23/04* (2013.01)

(58) Field of Classification Search
CPC ............ H02K 1/17; H02K 1/02; H02K 23/40; H02K 23/04; H01F 7/021
(Continued)

(56) References Cited

U.S. PATENT DOCUMENTS 7,414,341 B2 * 8/2008 Yokota ................ H02K 1/2786
310/156.28
2004/0061410 A1   4/2004 Ando
(Continued)

FOREIGN PATENT DOCUMENTS

CN   102195372 A   9/2011
JP   S62-168771   10/1987
(Continued)

OTHER PUBLICATIONS

Patent Cooperation Treaty: International Preliminary Report on Patentability for PCT/JP2015/082894 dated Feb. 23, 2016; 10 pages (including English translation).
(Continued)

*Primary Examiner* — Terrance L Kenerly
(74) *Attorney, Agent, or Firm* — Schwabe Williamson & Wyatt, PC

(57) ABSTRACT

A fixing structure for a permanent magnet includes: a cylindrical housing; a permanent magnet housed inside the housing; and an adhesive layer formed in a gap G between the housing and the permanent magnet and having an adhesive for fixing the permanent magnet to the housing. The adhesive layer is formed such that a filling rate of the adhesive is higher in the gap at another axial end of the permanent magnet than at one axial end of the permanent magnet. The permanent magnet is configured such that a density at said other axial end is higher than the density at said one axial end.

13 Claims, 4 Drawing Sheets

(51) Int. Cl.
    *H02K 1/02*        (2006.01)
    *H02K 23/40*      (2006.01)
    *H02K 23/04*      (2006.01)

(58) Field of Classification Search
    USPC .......................................................... 310/43
    See application file for complete search history.

(56) References Cited

U.S. PATENT DOCUMENTS

| | | |
|---|---|---|
| 2004/0088852 A1 | 5/2004 | Ogawa |
| 2006/0158054 A1 | 7/2006 | Akabane |
| 2009/0174273 A1* | 7/2009 | Watanabe .............. H02K 15/03 |
| | | 310/156.53 |
| 2013/0320795 A1* | 12/2013 | Enomoto ............. H02K 49/106 |
| | | 310/103 |
| 2016/0049836 A1 | 2/2016 | Shimomura |

FOREIGN PATENT DOCUMENTS

| | | |
|---|---|---|
| JP | 2001-178041 A | 6/2001 |
| JP | 2004-159384 A | 6/2004 |
| JP | 2005-086965 A | 3/2005 |
| JP | 2009-137138 A | 6/2009 |

OTHER PUBLICATIONS

International Search Report for PCT/JP2015/082894 dated Feb. 23, 2016; 3 pages, including English translation.

The State Intellectual Property Office of People's Republic of China: First Office Action for Chinese Application No. 201580043861.0, dated May 21, 2018; 13 pages including English translation.

\* cited by examiner

10

STRUCTURE FOR FIXING PERMANENT MAGNET AND MOTOR AND METHOD OF FIXING PERMANENT MAGNET

This application is based upon and claims the benefit of priority from the prior Japanese Patent Application No. 2014-248287, filed on Dec. 8, 2014, and International Patent Application No. PCT/JP 2015/082894, filed on Nov. 24, 2015, the entire content of each of which is incorporated herein by reference.

BACKGROUND OF THE INVENTION

1. Field of the Invention

The present invention relates to a structure for fixing a permanent magnet used in a motor.

2. Description of the Related Art

DC motors in which a permanent magnet is used in a stator and a coil is used in a rotor (armature) are proposed. Generally, a permanent magnet is fixed inside a housing by using an adhesive. Various methods of fixing are proposed. For example, the inner circumferential surface of the side wall of a case may be coated with an adhesive. By inserting a permanent into the case, spreading the adhesive by using the end of the permanent magnet, the adhesive is spread between the outer circumferential surface of the permanent magnet and the inner circumferential surface of the case. Thus, the permanent magnet can be fixed at a desired position (see patent document 1). As a method of manufacturing a permanent magnet used in a stator, there is proposed a method of manufacturing a ring-shaped bonded magnet by injecting a molten resin member that contains magnetic powder (see patent document 2).

[patent document 1] Published Utility Model Application 62-168711 [patent document 2] JP2009-137138

If there is a difference in linear expansion coefficient between the permanent magnet, the case, and the adhesive, the permanent magnet will undergo a stress due to a change in the temperature, which could result in a crack in the permanent magnet. In the case that the inner circumferential surface of the case is coated with an adhesive before inserting the permanent magnet, a portion of the adhesive is dragged in the direction of insertion due to the movement of the end face or lateral face of the permanent magnet. It would therefore be difficult to ensure a uniform amount of adhesive coating over the entirety of the space between the inner circumferential surface of the case and the outer circumferential surface of the permanent magnet.

SUMMARY OF THE INVENTION

The present invention addresses this background and a purpose thereof is to provide a technology capable of preventing a crack in a permanent magnet.

A fixing structure for a permanent magnet according to an embodiment of the present invention, comprising: a cylindrical housing; a permanent magnet housed inside the housing; and an adhesive layer formed in a gap between the housing and the permanent magnet and having an adhesive for fixing the permanent magnet to the housing. The adhesive layer is formed such that a filling rate of the adhesive is higher in the gap at another axial end of the permanent magnet than at one axial end of the permanent magnet. The permanent magnet is configured such that a density at said other axial end is higher than the density at said one axial end.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
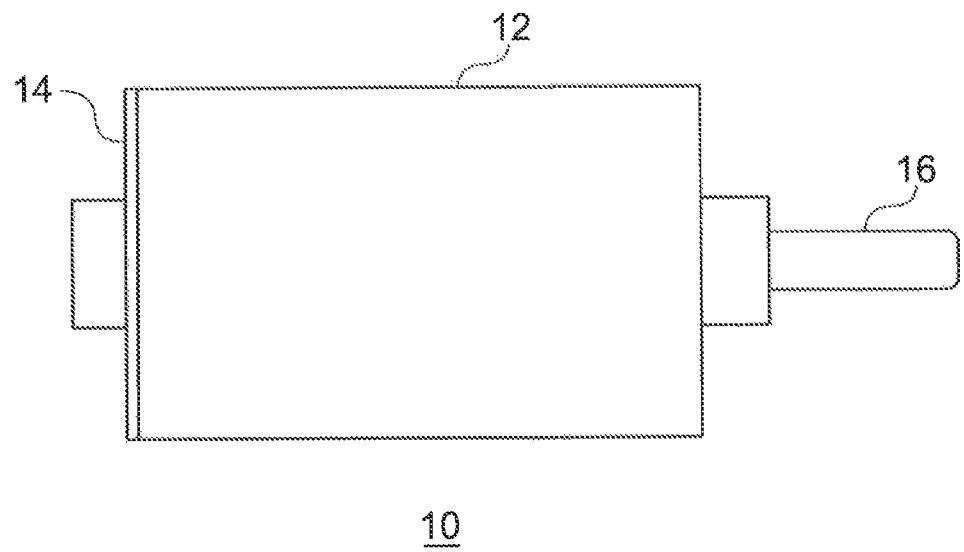
FIG. 1 is a lateral overall view of the DC motor according to the embodiment.

A fixing structure for a permanent magnet according to an embodiment, comprising: a cylindrical housing; a permanent magnet housed inside the housing; and an adhesive layer formed in a gap between the housing and the permanent magnet and having an adhesive for fixing the permanent magnet to the housing. The adhesive layer is formed such that a filling rate of the adhesive is higher in the gap at another axial end of the permanent magnet than at one axial end of the permanent magnet. The permanent magnet is configured such that a density at said other axial end is higher than the density at said one axial end.

According to this embodiment, the adhesive layer is formed such that the filling rate of the adhesive is higher in the gap at the other axial end of the permanent magnet than at the one axial end of the permanent magnet. In this case, if the parts, which differ in linear expansion coefficient, are expanded or shrunk due to a temperature change, the stress generated at the other axial end of the permanent magnet characterized by a higher filling rate of the adhesive tends to be large. By configuring the permanent magnet such that the density at the other axial end is higher than the density at the one axial end, the strength of the permanent magnet at the other axial end is increased so that a crack in the permanent magnet due to the stress generated at the other axial end can be prevented.

The permanent magnet may be a bonded magnet in which a magnetic material is distributed. This makes it relatively easy to configure the permanent magnet such that the density at the other axial end is higher than the density at the one axial end.

The permanent magnet may be manufactured by injection molding. This makes it possible to configure the permanent magnet such that the density at the other axial end is higher than the density at the one axial end, by lowering the injection temperature.

The permanent magnet may be a SmFeN magnet. This makes it possible that the magnetic property of the magnet can be prevented from dropping and, at the same time, the density at the other axial end is higher than the density at the one axial end, by using a low injection temperature to manufacture the magnet.

The adhesive layer may include an epoxy or acrylic adhesive. This can improve the precision of positioning the permanent magnet with respect to the housing. As a result, the gap from the rotor located at the center of the permanent magnet can be reduced, for example.

Another embodiment relates to a motor. The motor comprises: the fixing structure for a permanent magnet; and a rotor located at a center of the permanent magnet.

Still another embodiment relates to a method of fixing a permanent magnet used in a motor in a housing. The method comprises: coating a predetermined area on an inner circumferential surface of the housing with an adhesive; inserting the permanent magnet from an opening of the housing and pressing the permanent magnet to a predetermined position, spreading the adhesive in a direction of insertion; and adhesively fixing an inner circumferential surface of the housing to an outer circumferential surface of the permanent magnet by the adhesive thus spread. In inserting the permanent magnet, one of ends of the permanent magnet where a density is higher is a leading edge of the permanent magnet inserted into the housing.

According to this embodiment, the adhesive layer can be formed such that a filling rate of the adhesive is higher in the gap at the other axial end of the permanent magnet than at the one axial end of the permanent magnet. Also, the permanent magnet can be placed such that the density at the other axial end is higher than the density at the one axial end, to suit the structure of the adhesive layer.

Optional combinations of the aforementioned constituting elements, and implementations of the invention in the form of methods, apparatuses, and systems may also be practiced as additional modes of the present invention.

A description will be given of an embodiment of the present invention with reference to the drawings. Like numerals represent like elements so that the description will be omitted accordingly. The structure described below is by way of example only and does not limit the scope of the invention. A DC motor is described below by way of example.

Figure 2:
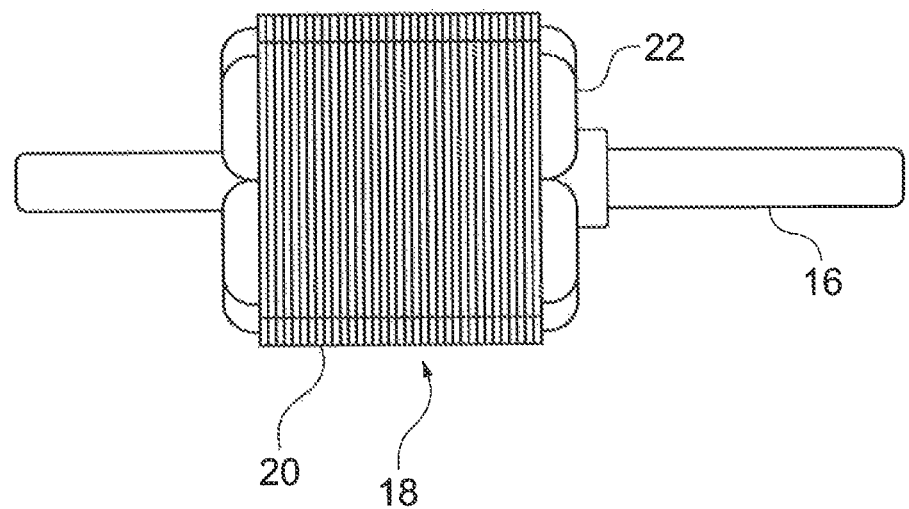
FIG. 2 is a lateral view of the rotor used in the DC motor according to the embodiment.

(DC motor) FIG. 1 is a lateral overall view of the DC motor according to the embodiment. FIG. 2 is a lateral view of the rotor used in the DC motor according to the embodiment.

As shown in FIG. 1, a DC motor 10 includes: a yoke housing 12 that houses components such as a permanent magnet, a rotor, etc. described below; an end bell 14 that houses a brush and a terminal; and a shaft 16. As shown in FIG. 2, the rotor 18 includes a core 20 through which a shaft 16 extends at the center, and a coil 22 wound around the core 20.

Figure 3:
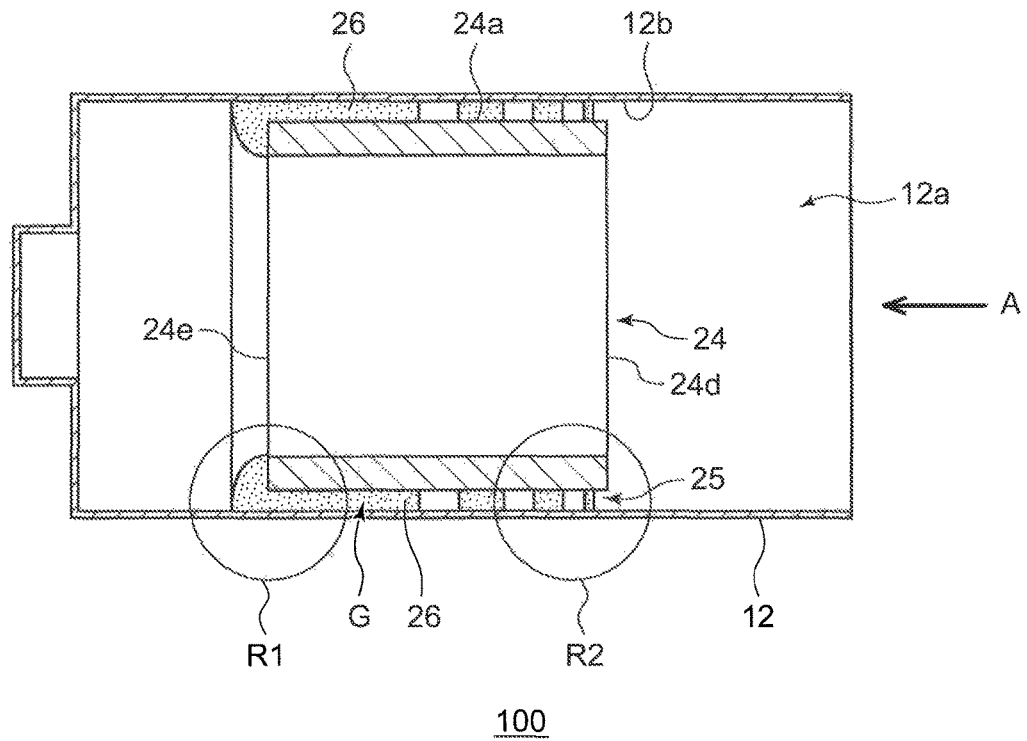
FIG. 3 is a cross sectional view of the yoke housing according to the embodiment.
Figure 4:
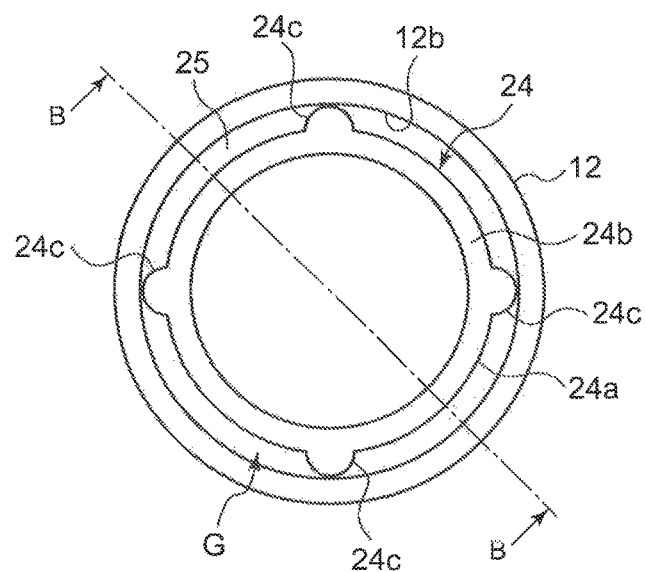
FIG. 4 is a front view of the yoke housing shown in FIG. 3 in the direction of the arrow A.

FIG. 3 is a cross sectional view of the yoke housing 12 according to the embodiment. FIG. 4 is a front view of the yoke housing shown in FIG. 3 in the direction of the arrow A. The cross sectional view shown in FIG. 3 shows a section along B-B of the yoke housing shown in FIG. 4.

The yoke housing 12 is a cylindrical member having an opening 12a in which an annular permanent magnet 24 is inserted. The rotor 18 shown in FIG. 2 is rotatably supported at the center of the permanent magnet 24 by bearings (not shown) provided in the yoke housing 12 and the end bell 14. An adhesive 26 (not shown in FIG. 4) provided in an adhesive layer 25 adhesively attaches the inner circumferential surface 12b of the yoke housing 12 and the outer circumferential surface 24a of the permanent magnet 24. In other words, the outer circumferential surface 24a of the permanent magnet 24 is bonded to the inner circumferential surface 12b of the yoke housing 12 via the adhesive 26.

The permanent magnet 24 includes a cylindrical part 24b having a smaller outer diameter than the inner circumferential surface 12b of the yoke housing 12 to which the permanent magnet 24 fixed, and four band-like ribs 24c formed on the outer circumferential surface 24a of the cylindrical part 24b and placed in contact with the inner circumferential surface 12b of the yoke housing 12. Preferably, the ribs 24c are in a shape just capable of temporarily joining the permanent magnet 24 to the yoke housing 12 such that the permanent magnet 24 is not tilted in the yoke housing 12 or dislodged from the yoke housing 12 as the permanent magnet 24 is inserted into the yoke housing 12. The requirement for the ribs 24c is that they come into contact with the inner circumferential surface 12b of the yoke housing 12. The ribs 24c may be implemented as one or more bands or convex shapes that go around the entire outer circumferential surface 24a of the permanent magnet 24.

Any of a variety of types of permanent magnet may be applicable for permanent magnet 24. Considering the motor performance, magnets with a large maximum energy product such as samarium-iron-nitrogen magnets, samarium-cobalt magnets, neodymium magnets are preferable. For example, the permanent magnet 24 may be manufactured by sintering powder or injection-molding a compound material in which magnetic powder and resin are mixed.

The adhesive 26 is provided in a gap between the inner circumferential surface 12b of the yoke housing 12 and the cylindrical part 24b of the permanent magnet 24. Any of a variety of types of adhesive may be applicable for the adhesive 26. For example, epoxy resin adhesives or acrylic resin adhesives may be used. Particular, two-pack epoxy resin adhesives that do not require heat for curing are preferable. The hardness exhibited by these adhesives when the motor is used after the permanent magnet 24 is adhered is more than that of rubber adhesives. Therefore, the adhesives can prevent the permanent magnet 24 from being displaced from its original position.

Thus, a fixing structure 100 for a permanent magnet according to the embodiment includes a permanent magnet 24 housed inside the yoke housing 12, and an adhesive layer 25 formed in a gap between the yoke housing 12 and the permanent magnet 24 and having an adhesive 26 for fixing the permanent magnet 24 to the yoke housing 12.

Figure 5A:
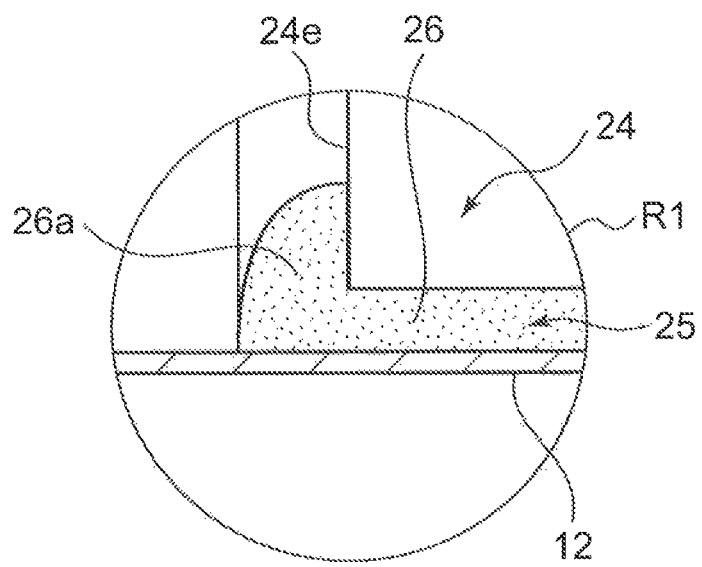
FIG. 5A is an enlarged view of the region R1 of FIG. 3.
Figure 5B:
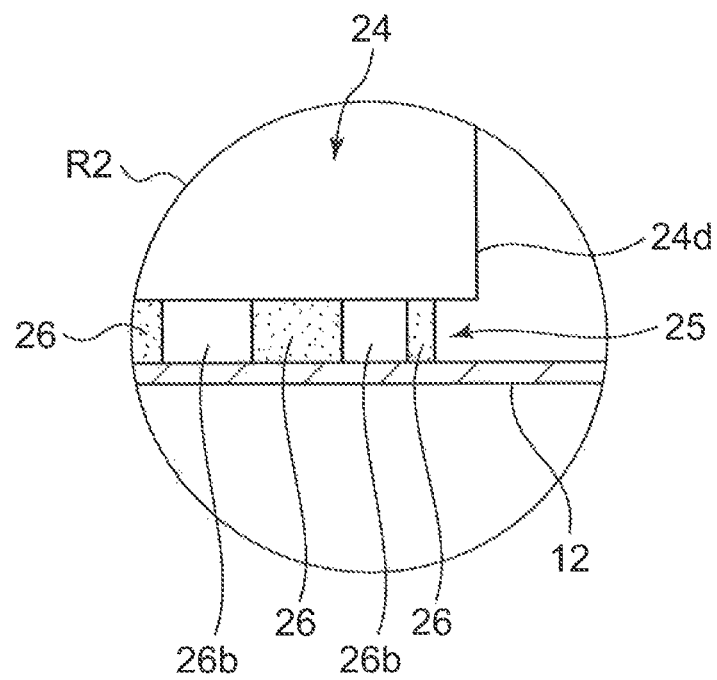
FIG. 5B is an enlarged view of the region R2 of FIG. 3.

FIG. 5A is an enlarged view of a region R1 of FIG. 3, and FIG. 5B is an enlarged view of a region R2 of FIG. 3; and As shown in FIGS. 5A and 5B, the adhesive layer 25 is formed such that the filling rate of the adhesive 26 is higher in the gap G at another axial end (toward a region R1) of the permanent magnet 24 than the density at one axial end (toward a region R2) of the permanent magnet 24.

More specifically, as shown in FIG. 5A, the adhesive 26 extruded in the direction of insertion when the permanent magnet 24 is inserted into the yoke housing 12 is turned into a puddle of adhesive 26a in the region R1. For this reason, the filling rate of the adhesive 26 is relatively high in the region R1. Meanwhile, as shown in FIG. 5B, portions of the adhesive 26 coating the region R2 in advance are dragged by the permanent magnet 24 and is moved in the direction of insertion (direction toward the region R1) when permanent magnet 24 is inserted into the yoke housing 12. Therefore, spaces 26b are created in places. For this reason, the filling rate of the adhesive 26 is relatively low in the region R2. The "filling rate" of the adhesive can be understood as a ratio occupied by the adhesive in a unit space of the adhesive layer. In other words, the filling rate can be translated into weight per unit volume (filling density).

If the adhesive layer 25 in which the filling rate differs depending on the location is formed in this way, it is likely that the following phenomenon occurs. The linear expansion coefficient of the adhesive 26 according to the embodiment is higher than the linear expansion coefficient of silicon steel, low carbon steel, or the like forming the yoke housing 12. For this reason, if the temperature of the motor as a whole, including the permanent magnet 24, changes, stress due to the expansion and shrinkage of the adhesive 26 is exerted on the permanent magnet 24.

Since the filling rate of the adhesive 26 is higher in the region R1, the stress exerted between the adhesive 26 and the permanent magnet 24, which are prevented from being deformed by the yoke housing 12, grows relatively large in the portion of the permanent magnet 24 located toward the back of the yoke housing 12. This could result in crack in the permanent magnet 24.

As mentioned before, if the yoke housing 12, the permanent magnet 24, and the adhesive 26, which differ in linear expansion coefficient, are expanded or shrunk due to a temperature change, the stress generated at the other axial end 24e of the permanent magnet characterized by a higher filling rate of the adhesive 26 tends to be large. By configuring the permanent magnet 24 such that the density at the other axial end 24e is higher than the density at the one axial end 24d according to the embodiment, the strength of the permanent magnet 24 at the other axial end 24e is increased so that a crack in the permanent magnet 24 due to the stress exerted on the other axial end 24e can be prevented.

The permanent magnet 24 according to the embodiment may be a bonded magnet in which a magnetic material is distributed in a resin material suitable for injection molding. Considering the magnetic property of the permanent magnet 24, the proportion of the magnetic material in the permanent magnet 24 is 80% or higher, and, more preferably, 85% or higher, and, still more preferably, 90% or higher. Thus, it is relatively easy to configure the permanent magnet 24 such that the density at the other axial end is higher than the density at the one axial end, as compared with a sintered magnet mostly comprised of a magnetic material.

The permanent magnet 24 is manufactured by injection molding. In certain types of permanent magnets manufactured by injection molding, the density in the neighborhood of the gate of the mold tends to be high and the density away from the gate tends to low, if the injection temperature is low or cooling speed is high. This can be taken advantage of to configure the permanent magnet 24 such that the density at the other axial end is higher than the density at the one axial end, by lowering the injection temperature.

The density over the entirety of the component can be made uniform by increasing the injection temperature or reducing the cooling speed. However, this requires a longer time for cooling and is not favorable in terms of productivity. Particular, if the injection temperature is increased, the magnetic property of certain types of permanent magnets as manufactured (e.g., samarium-iron-nitrogen magnets (SmFeN magnets)) drops below a desired value due to demagnetization caused by the heat. Meanwhile, SmFeN magnets are less expensive than samarium-cobalt magnets and are desirable as rare earth magnets that do not use cobalt. For this reason, SmFeN magnets will find more applications as bonded magnets if the injection temperature can be lowered.

Thus, where a SmFeN magnet is used as the permanent magnet, the magnetic property of the magnet can be prevented from dropping and, at the same time, the density at the other axial end can be ensured to be higher than the density at the one axial end, by using a low injection temperature to manufacture the magnet.

As described above, the adhesive layer 25 includes an epoxy or acrylic adhesive 26. This can improve the precision of positioning the permanent magnet 24 with respect to the yoke housing 12 and can prevent the permanent magnet from being displaced from its original position due to a temperature change. As a result, the gap from the rotor 18 located at the center of the permanent magnet 24 can be reduced and the motor property can be improved.

(Method of Fixing the Permanent Magnet)

Figure 6:
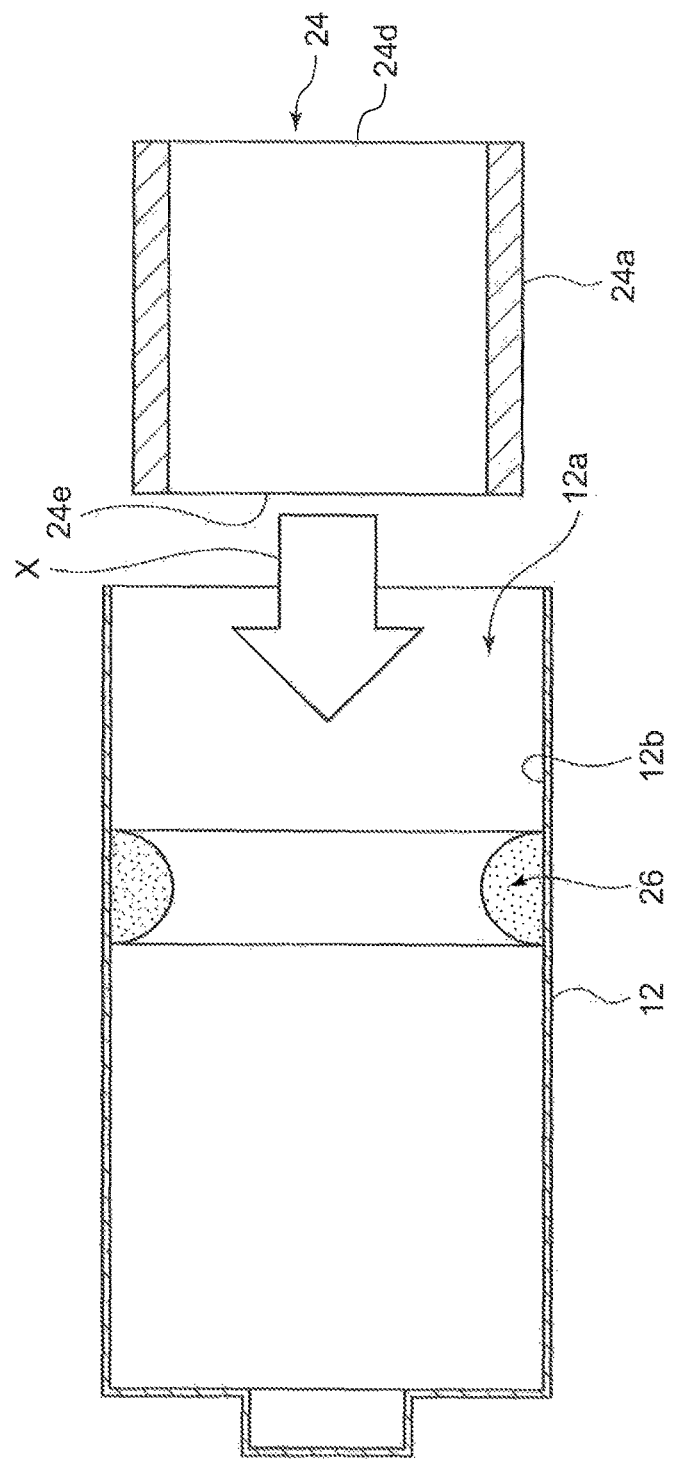
FIG. 6 is a schematic view for illustrating the method of fixing the permanent magnet according to the embodiment.

FIG. 6 is a schematic diagram illustrating a method of fixing the permanent magnet according to the embodiment. The method of fixing the permanent magnet according to the embodiment is a method of fixing the permanent magnet 24 used in the motor to the yoke housing 12. The method includes annularly coating a predetermined area on the inner circumferential surface 12b of the yoke housing 12 with the adhesive 26, inserting the permanent magnet 24 from the opening 12a of the yoke housing 12 and pressing the permanent magnet 24 to a predetermined position (position shown in FIG. 3), spreading the adhesive 26 in the direction of insertion (axial direction) X, and adhesively fixing the inner circumferential surface 12b of the yoke housing 12 to the outer circumferential surface 24a of the permanent magnet 24 by the adhesive 26 thus spread. In the step of insertion, the other axial end 24e (gate side end) of the permanent magnet 24 where the density is higher is the leading edge of the permanent magnet 24 inserted into the yoke housing 12. As a result, the position of the other axial end 24e (gate side end) of the permanent magnet 24 where the density is higher will be settled where the puddle of adhesive 26a is, as shown in FIG. 3.

Accordingly, the adhesive layer 25 can be formed such that the filling rate of the adhesive 26 in the gap at the other axial end 24e of the permanent magnet 24 is higher than at the one axial end 24d, as in the fixing structure 100 for the permanent magnet shown in FIG. 3. Also, the permanent magnet 24 can be placed such that the density at the other axial end 24e is higher than the density at the one axial end 24d, to suit the structure of the adhesive layer 25.

A description was given of the present invention with reference to the above embodiment. The embodiments of the present invention are not limited to those described above and appropriate combinations or replacements of the features of the embodiment are also encompassed by the present invention. The embodiments may be modified by way of combinations, rearranging of the processing sequence, design changes, etc., based on the knowledge of a skilled person, and such modifications are also within the scope of the present invention.

The outer circumference of the yoke housing 12 and the permanent magnet 24 according to the embodiment was described above as having a circular shape by way of example. Alternatively, the outer circumference of the respective members may have a polygonal shape.

The invention claimed is:

1. A fixing structure for a permanent magnet, comprising:
    a cylindrical housing;
    a permanent magnet housed inside the housing; and
    an adhesive layer formed in a gap between the housing and the permanent magnet and having an adhesive for fixing the permanent magnet to the housing, wherein
    the adhesive layer is formed such that a filling rate of the adhesive is higher in the gap at another axial end of the permanent magnet than at one axial end of the permanent magnet, and
    the permanent magnet is configured such that a density at said other axial end of the permanent magnet is higher than the density at said one axial end of the permanent magnet.

2. The fixing structure for a permanent magnet according to claim 1, wherein
the permanent magnet is a bonded magnet in which a magnetic material is distributed.

3. The fixing structure for a permanent magnet according to claim 1, wherein
the permanent magnet is manufactured by injection molding.

4. The fixing structure for a permanent magnet according to claim 2, wherein
the permanent magnet is manufactured by injection molding.

5. The fixing structure for a permanent magnet according to claim 1, wherein
the permanent magnet is a SmFeN magnet.

6. The fixing structure for a permanent magnet according to claim 2, wherein
the permanent magnet is a SmFeN magnet.

7. The fixing structure for a permanent magnet according to claim 3, wherein
the permanent magnet is a SmFeN magnet.

8. The fixing structure for a permanent magnet according to claim 1, wherein
the adhesive layer includes an epoxy or acrylic adhesive.

9. The fixing structure for a permanent magnet according to claim 2, wherein
the adhesive layer includes an epoxy or acrylic adhesive.

10. The fixing structure for a permanent magnet according to claim 3, wherein
the adhesive layer includes an epoxy or acrylic adhesive.

11. The fixing structure for a permanent magnet according to claim 5, wherein
the adhesive layer includes an epoxy or acrylic adhesive.

12. A motor comprising:
the fixing structure for a permanent magnet according to claim 1; and
a rotor located at a center of the permanent magnet.

13. A method of fixing a permanent magnet for fixing a permanent magnet used in a motor in a housing, comprising:
coating a predetermined area on an inner circumferential surface of the housing with an adhesive;
inserting the permanent magnet from an opening of the housing and pressing the permanent magnet to a predetermined position, spreading the adhesive in a direction of insertion by means of the permanent magnet; and
adhesively fixing an inner circumferential surface of the housing to an outer circumferential surface of the permanent magnet by the adhesive, wherein
in inserting the permanent magnet, one end of the permanent magnet where a density of the permanent magnet is higher is a leading edge of the permanent magnet inserted into the housing.

* * * * *